United States Patent
Kitazawa et al.

(10) Patent No.: US 8,120,731 B2
(45) Date of Patent: Feb. 21, 2012

(54) COLOR FILTER (75) Inventors: Kazushige Kitazawa, Tokyo (JP); Shigeru Hirayama, Tokyo (JP); Teruhiko Kai, Tokyo (JP); Shinya Kanno, Tokyo (JP)

(73) Assignee: Toppan Printing Co., Ltd. (JP)

( * ) Notice: Subject to any disclaimer, the term of this patent is extended or adjusted under 35 U.S.C. 154(b) by 1131 days.

(21) Appl. No.: 11/900,602

(22) Filed: Sep. 11, 2007

(65) Prior Publication Data

US 2009/0068396 A1 Mar. 12, 2009

(51) Int. Cl.
G02F 1/1335 (2006.01)
G02F 1/1333 (2006.01)

(52) U.S. Cl. .................................. 349/106; 349/110
(58) Field of Classification Search .................. 349/106
See application file for complete search history.

(56) References Cited

U.S. PATENT DOCUMENTS

| | | | |
|---|---|---|---|
| 6,309,783 B1 * | 10/2001 | Shiba et al. | 430/7 |
| 6,407,783 B1 * | 6/2002 | Ohgawara et al. | 349/110 |
| 2004/0201804 A1 * | 10/2004 | Ting et al. | 349/114 |
| 2005/0174043 A1 * | 8/2005 | Kiguchi et al. | 313/503 |
| 2009/0047597 A1 * | 2/2009 | Felder et al. | 430/201 |

FOREIGN PATENT DOCUMENTS

| | | |
|---|---|---|
| JP | 07-035915 | 2/1995 |
| JP | 07-035916 | 2/1995 |
| JP | 08-166507 | 6/1996 |
| JP | 09-073010 | 3/1997 |
| JP | 2000-180841 | 6/2000 |
| JP | 3328297 B2 | 9/2002 |
| JP | 2005-352105 | 12/2005 |
| JP | 2006-084911 | 3/2006 |
| JP | 2006-163233 | 6/2006 |
| JP | 2006-243588 | 9/2006 |
| JP | 2006-251433 | 9/2006 |
| JP | 2006-267821 | 10/2006 |
| JP | 2006-276180 | 10/2006 |
| JP | 2006-284674 | 10/2006 |

* cited by examiner

*Primary Examiner* — Nathanael R Briggs
(74) *Attorney, Agent, or Firm* — Squire Sanders (US) LLP (57) ABSTRACT

An article having a color pattern formed therein comprises a substrate, banks on the substrate, and a colored layer provided between the banks. The colored layer has a thickness of 80-120% of an average thickness thereof. In addition, the banks have an ink repelling agent or the upper apex portion of the banks has ink repelling ability.

10 Claims, 5 Drawing Sheets a and c: thickness of an end portion
b: thickness of the receded portion

COLOR FILTER

BACKGROUND OF THE INVENTION

1. Field of the Invention

The present invention relates to an article having a color pattern (colored layer) formed on a substrate, such as a color filter or an electroluminescence element for use in a color display device or the like.

2. Description of the Related Art

A color filter for use in a color liquid-crystal display device is an indispensable component of such device and serves to improve image quality of the liquid-crystal display device and provide the primary colors to each colored layer (pixel). Methods for manufacturing color filters have been actively studied, and examples of known representative methods include a photolithography method and an ink-jet method. With a photolithography method, coating films of photosensitive resin layers of each color are formed on the entire substrate and then unnecessary portions of the coating films are removed and the remaining patterns are used as colored layers of each color. For the most part the coating films become unnecessary in this method and, therefore, a large amount of materials such as pigments are wasted when a color filter is manufactured. In addition, the number of production steps is large because exposure and development are carried out for colored layers of all colors. Accordingly, in the manufacture of color filters by photolithography, problems are associated with both the cost and the environmental aspects. In particular, the size of liquid crystal displays has been increasing in recent years, resulting in corresponding increase in the size of color filters and the amount of wasted materials. An ink-jet method has recently attracted attention as a method for manufacturing color filters that resolves the aforementioned problems. When a color filter is manufactured by an ink-jet method in which inks are locally sprayed from ink nozzles, the inks of each color of the colored layers of three colors R, G, B are printed simultaneously. Therefore, the process is implemented in one cycle. As a result, waste of colored resin compositions such as pigments practically does not occur and at the same time the process of forming colored layers of three colors can be shortened, thereby making it possible to expect the reduction of environmental load and a significant cost reduction.

Methods described in Patent Documents 1-4 are suggested as methods for manufacturing a color filter by using an ink-jet process. Patent Document 1 describes that in order to prevent the spread of ink to the outside of the desired coloration region on a glass substrate, a color pattern is formed by introducing a water- and oil-repelling agent based on hydrofluoric acid in advance into banks, thereby fixing the ink only within the coloration region. Further, Patent Document 2 and Patent Document 3 describe that a monochromatic resin layer comprising a fluorine-containing compound and/or a silicon-containing compound is used as a bank for preventing ink bleeding and color mixing in the coloration process. In Patent Document 4, an ink head is prevented from clogging by using a solvent with a high boiling point for the ink.

However, with the above-described conventional methods, colored layers are formed by ink jets, then the solvent component of colored resin composition of each colored layer is dried within a short time at a low temperature, and then the thermosetting resin components of the colored resin compositions are cured. The resultant problem is that the post-bake process of the thermosetting resins involves two heating stages and becomes long. Another problem is that the colored resin composition cured in each colored layer (referred to hereinbelow as "cured colored resin") is not sufficiently flat and has a convex shape. For this reason, a spread occurs in the shapes of colored layers of color filters, causing problems such as nonuniform color in color liquid crystal display devices manufactured using the color filter.

The present invention was created to resolve the above-described problems and it is an object of the invention to provide an article having a color pattern formed therein, wherein each colored layer has a flat color pattern. Another object of the invention is to provide an article having a color pattern formed therein in which a spread of color of the colored layers is suppressed, this article having excellent required characteristics such as low cost and short production process.

Patent Document 1: JP-A-6-347637
Patent Document 2: JP-A-7-35915
Patent Document 3: JP-A-7-35917
Patent Document 4: JP-A-2000-310706

SUMMARY OF THE INVENTION

A mode for carrying out the invention is an article having a color pattern formed therein, comprising: a substrate; banks on the substrate; and a colored layer, provided between the banks, having an average thickness wherein the thickness at any specific point on the colored layer may vary up to plus or minus 20% from the average.

BRIEF DESCRIPTION OF THE DRAWINGS

FIGS. 2(a), (b) and (c) are cross-sectional views of an article having a color pattern formed therein (color filter) of the present invention.

EXPLANATION OF REFERENCE NUMERALS 1 substrate
2 bank
3 colored layer
4 protection layer

DESCRIPTION OF THE PREFERRED EMBODIMENTS

A research conducted by the inventors demonstrated that when heating is conducted under conditions such that drying and curing of colored resin composition, which were conventionally carried out separately, proceed at the same time, a central portion of the colored resin composition that was conventionally convex recedes. It was further found that a colored layer (cured colored resin) of a flat shape can be obtained by using this phenomenon. As a result, a high-quality article having a color pattern formed therein can be obtained without problems such as color spread in the colored layers.

The article having a color pattern formed therein in accordance with the present invention can be a color filter if color patterns are formed from colored resin compositions for color filters. A liquid crystal display device and a color EL display device including white electroluminescence can be considered as color filters.

A color EL display device can be also obtained by forming color patterns from inks for electroluminescence.

An example in which the article with a color pattern formed therein is a color filter will be explained below.

Figure 1:
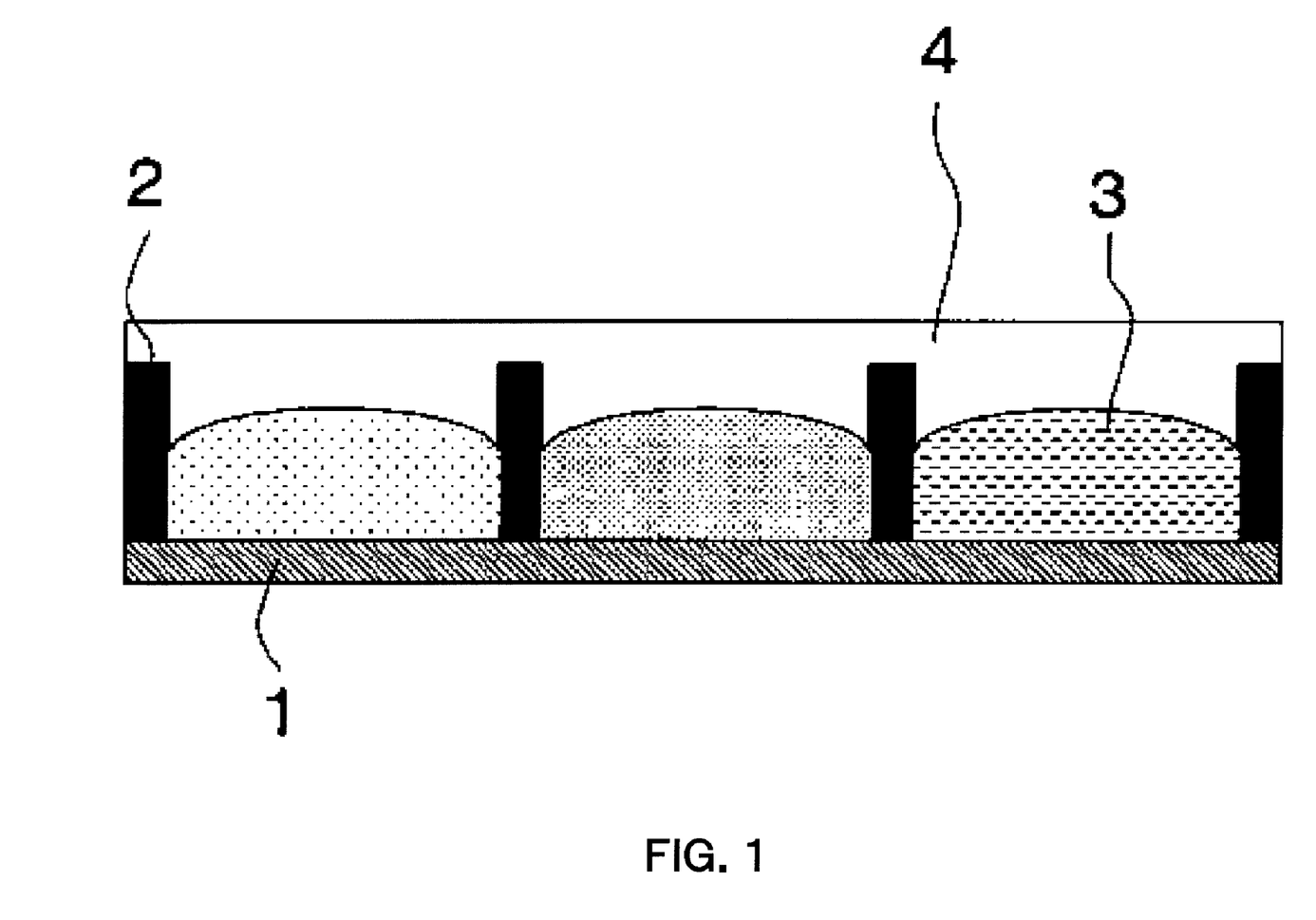
FIG. 1 is a cross-sectional view of an article having a color pattern formed therein (color filter) of the present invention.

As shown in FIG. 1, in a color filter, a bank 2 is provided on a substrate 1 to increase contrast, then red (R), green (G), blue (B) colored layers 3 are formed and a protective layer 4 is provided thereupon. When this configuration serves for liquid crystals, a transparent conductive layer and an orientation film are further successively laminated. For example, a liquid crystal display device is configured by disposing the color filter opposite a counter substrate where electrodes such as thin-film transistors are formed and introducing liquid crystal between the substrates. A combination of the substrate, banks, and red, green, and blue colored layers (color patterns) will be referred to hereinbelow as a color filter.

The colored layers 3 are provided in the opening of the banks 2 and color patterns of three primary colors, usually a red-colored color pattern (R), a green-colored color pattern (G), and a blue-colored color pattern (B) are arranged to obtain a desired shape. Typical methods for forming the color patterns include a pigment dispersion method, a dyeing method, an electrodeposition method, a printing method, a transfer method, and an ink-jet method. In accordance with the present invention, the colored layers 3 are formed with an ink-jet device via the steps of patterning colored resin compositions and then heating in the below-described manner.

The device for use with ink jets can be of a piezo conversion system and a thermal conversion system, depending on the ink ejection method, but it is preferred that a piezo conversion system be used. An atomization frequency of ink in an ink-jet device is preferably about 5-100 KHz. A nozzle diameter of an ink jet device is preferably about 5-80 μm. It is also preferred that a plurality of heads be disposed in an ink-jet printer and that about 60-500 nozzles be assembled in one head.

Figure 2:
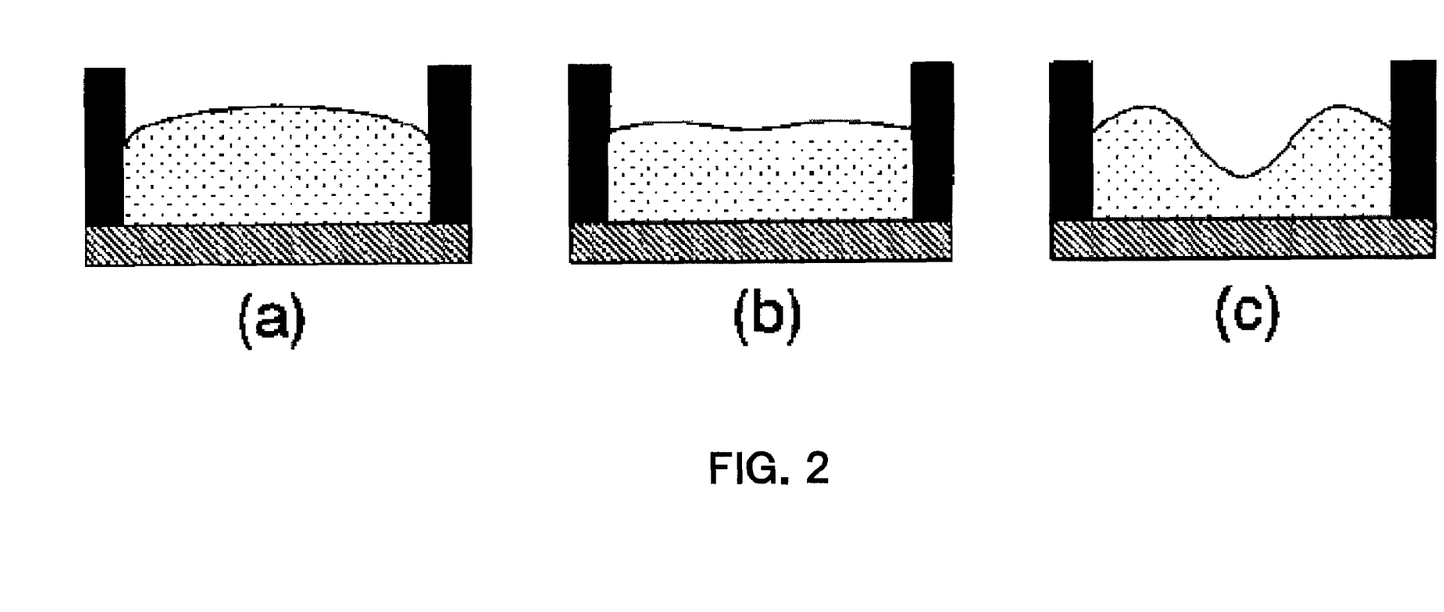

According to a conventional method, the colored layer 3 is obtained by heating a colored resin composition patterned with an ink jet for the first time under conditions such that the thermosetting resin is not cured (low temperature or short time) and then after drying solvent components, again heating under conditions such that the thermosetting resin is cured, thereby curing the thermosetting resin component. The colored resin composition immediately after patterning with an ink jet has a convex shape due to surface tension. In the first heating step, the colored resin composition is dried, while maintaining the convex shape, and looses plasticity. When the colored resin composition is then thermally cured by second heating, a convex colored layer 3 such as shown in FIG. 2(a) is formed. As a result, flat colored layers 3 cannot be obtained with this method.

In the present embodiment, the solvent of the colored resin composition is dried and the thermosetting resin is thermally cured at the same time by a single heating operation, without two-stage heating of the conventional process. In other words, the thermosetting resin is cured and the solvent is evaporated at the same time under a high-temperature atmosphere in which the thermosetting resin can be cured. As a result, the central portion of the colored resin composition recedes, thereby producing a colored layer 3 of a flat shape such as shown in FIG. 2(b). When a material having a low boiling point is used for the solvent of the colored resin composition, the recess in the central portion becomes more prominent and a colored layer 3 having a concave shape such as shown in FIG. 2(c) is obtained. Accordingly, where the boiling point of the solvent is lower than the thermal curing temperature of the thermosetting resin, the drying of the solvent during heating precedes the thermal curing of the thermosetting resin and the formation of the recess in the central portion the colored resin composition is advanced. In accordance with the present invention, the shape of the colored layer 3 can be flattened by selecting constituent materials of an appropriate colored resin composition so that the boiling temperature of the solvent is higher than the thermal curing temperature of the thermosetting resin.

Figure 3:
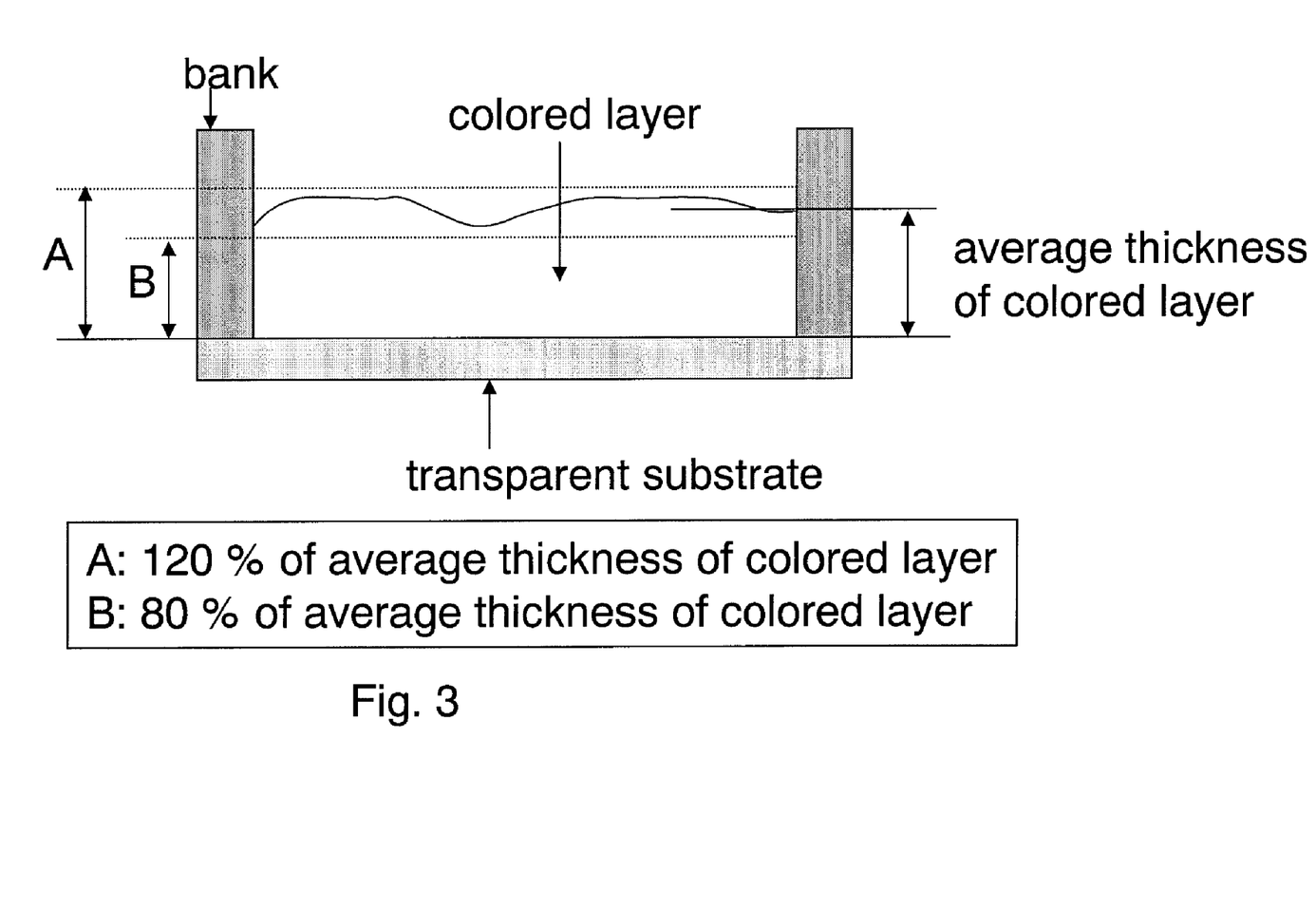
FIG. 3 illustrates an embodiment of the colored layer between banks having an average thickness such that the thickness at any specific point on the colored layer may vary up to plus or minus 20% from the average.
Figure 4:
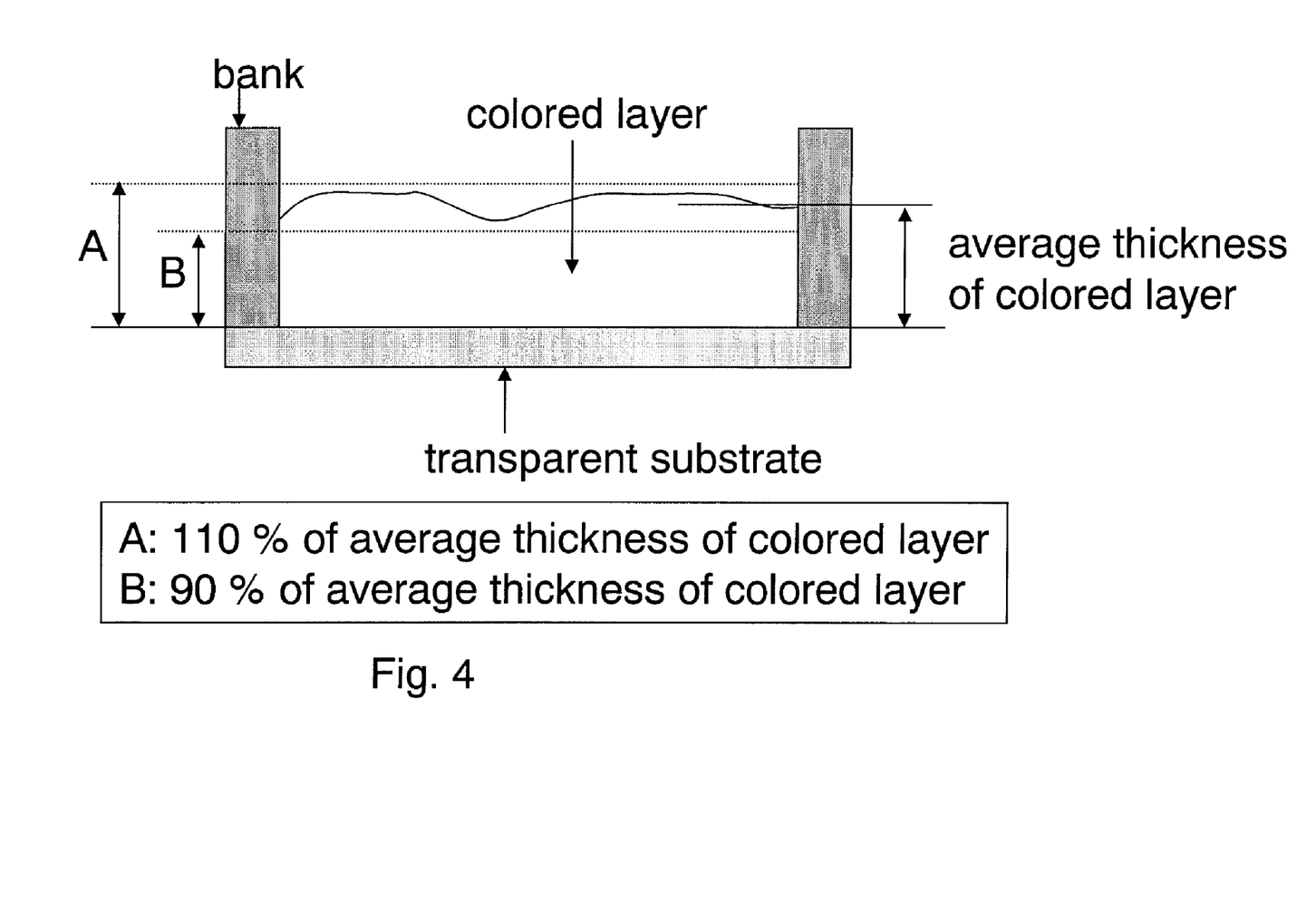
FIG. 4 illustrates an embodiment of the colored layer between banks having an average thickness such that the thickness at any specific point on the colored layer may vary up to plus or minus 10% from the average.

However, when a color filter is used in a display device, the color spread within a colored layer of the color filter has to be within a range in which a spread of color tone can be inhibited. A method is known for measuring color difference (ΔE*ab; color difference in the case of L*a*b* color system) that quantitatively represents the perceptive difference in colors as a specific measure of color tone. In order to reduce the color spread to a range in which the color difference spread can be inhibited, for example in the case of a general color filter such as described in embodiments below, a flat colored layer 3 with a thickness spread of 80-120% is obtained, thereby making it possible to inhibit the spread in color tone. Further, by selecting even more advantageous solvent and thermosetting resin, a colored layer 3 with better flatness can be obtained that has an average thickness wherein the thickness at any specific point on the colored layer may vary up to plus or minus 10% from the average.

As for heating conditions for the colored resin composition, it is preferred that the heating be conducted for 10-60 min at 180-240° C. Where the heating temperature is too low or the heating time is too short, drying of the solvent does not proceed. Where the heating temperature is too high or the heating time is too long, the central portion of the colored layer can recede too much and assume a concave shape. A hot plate, a hot-air furnace, or a far-IR furnace can be used for heating, but because the form of the colored layer 3 is difficult to change when surface drying of the colored resin composition advances too much, in accordance with the present invention a hot plate that conducts heating from below the substrate is preferably used for heating.

Figure 5:
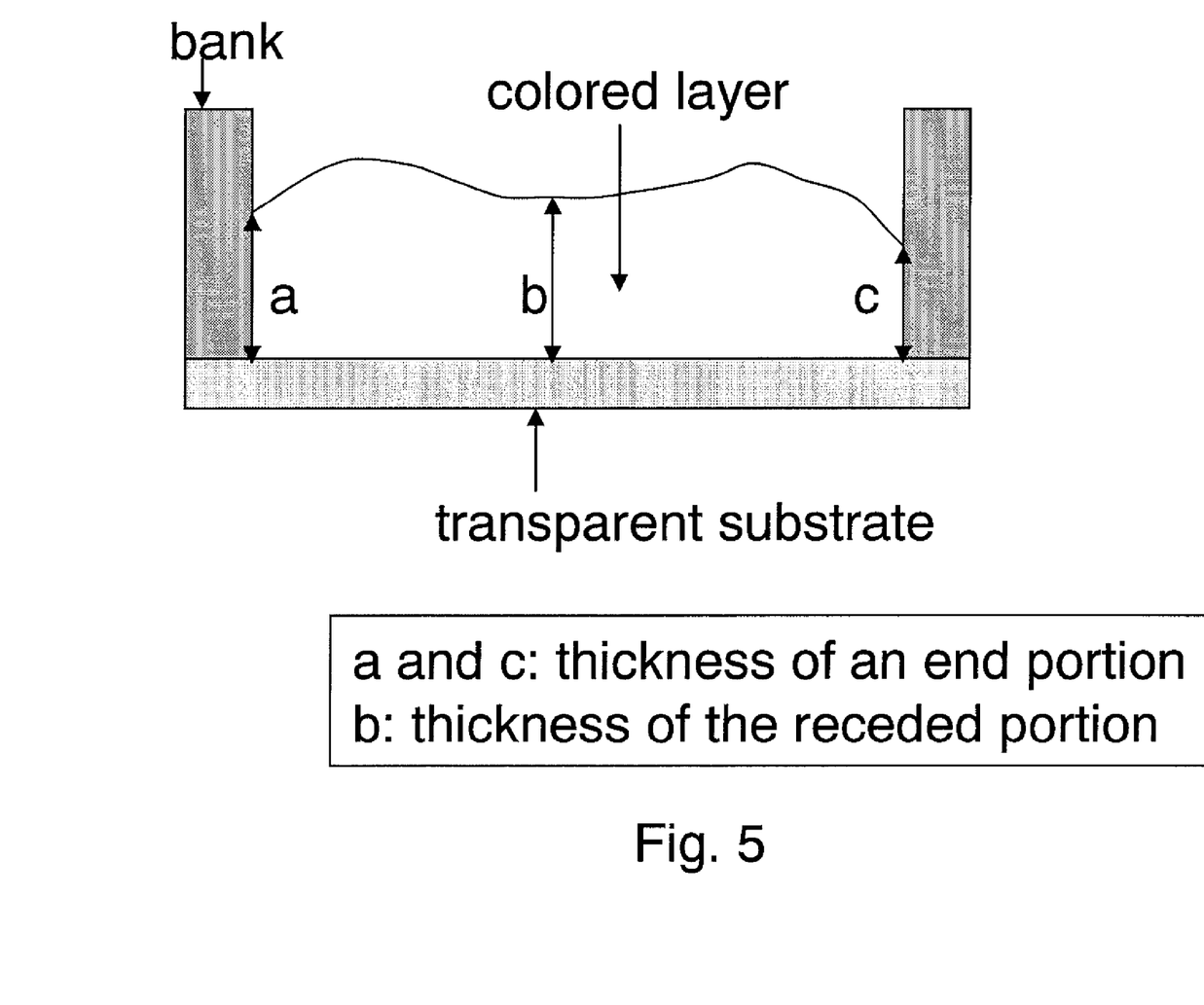
FIG. 5 illustrates an embodiment of the colored layer wherein a center of the colored layer has a receded portion and despite such a receded portion a thickness of the colored layer at the receded portion is still larger than a thickness of an end portion.

It is undesirable that the colored layer assume a shape with a central portion that recedes too much, and the center of the colored layer preferably recedes a little from a perfectly flat plane. More specifically, the shape is such that a center of the colored layer has a receded portion and despite such a receded portion a thickness of the colored layer at the receded portion is still larger than a thickness of an end portion.

Where the banks have ink repelling ability, ink is repelled from the portion of the colored layer that is in contact with the bank and the ink thickness decreases. As a result, by providing a certain recess in the central portion, the average film thickness can be reduced by comparison with that without the recess, the difference between the average film thickness and the thickness of the portion that is in contact with the bank can be decreased, and therefore a film with a high degree of flatness and a small difference between the average film thickness and the maximum film thickness and between the average film thickness and the minimum film thickness can be obtained.

The colored resin composition in accordance with the present invention comprises at least a colorant, a thermosetting resin, and a solvent. If necessary, the composition can additionally contain well-known additives such as a dispersant.

A dye, a pigment, or the like can be used as the colorant of the colored resin composition. In accordance with the present invention, it is preferred that pigments with excellent weather resistance be used. Specific examples of suitable colorants include Pigment Red 9, 19, 38, 43, 97, 122, 123, 144, 149, 166, 168, 177, 179, 180, 192, 215, 216, 208, 216, 217, 220, 223, 224, 226, 227, 228, 240, 254, Pigment Blue 15, 15; 6, 16, 22, 29, 60, 64, Pigment Green 7, 36, Pigment Yellow 20, 24, 86, 81, 83, 93, 108, 109, 110, 117, 125, 137, 138, 139, 147, 148, 150, 153, 154, 166, 168, 185, Pigment Orange 36, and Pigment Violet 23. Materials of two or more types can be used in a mixture to obtain the desired color tone.

The thermosensitive resin of the colored resin composition can be appropriately selected from the well-known color filter substrate materials in relation to the colorant. More specifically, casein, gelatin, poly(vinyl alcohol), carboxymethyl acetal, a polyimide resin, an acrylic resin, an epoxy resin, and a melamine resin can be used. When a color filter required to have heat resistance and light resistance is manufactured, it is especially preferred that an acrylic resin be used.

The solvent of the colored resin composition is selected based on printing compatibility with an ink-jet printer. It is especially preferred that a material with a surface tension within a range below 35 mN/m and a boiling point of 130° C. or higher be used. Where the surface tension is equal to or more than 35 mN/m, a strong adverse effect is produced on stability of dot shape during ink-jet ejection. Further, where the boiling point is less than 130° C., drying ability in the vicinity of the nozzle is greatly increased. As a result, undesirable effects such as nozzle clogging are produced. Further, the solvent can be appropriately selected based on the heat setting temperature of the thermosetting resin of the colored resin composition. Where a solvent is used that has a boiling point much lower than the heat curing temperature of the thermosetting resin, the colored layer can assume a concave shape, as described hereinabove. Specific examples of solvents satisfying the aforementioned conditions include diethylene glycol n-butyl ether, tetraethylene glycol dimethyl ether, pentaethylene glycol dimethyl ether, tripropylene glycol methyl ether, dipropylene glycol n-propyl ether, dipropylene glycol n-butyl ether, tripropylene glycol n-butyl ether, and propylene glycol phenyl ether. In addition, it is preferred that a solvent with a higher boiling point be used, and a solvent with a boiling point of 250° C. under normal pressure (1 atm) is especially preferred. Specific examples of such solvents include 2-methoxyethanol, 2-ethoxyethanol, 2-butoxyethanol, 2-ethoxyethyl acetate, 2-butoxyethyl acetate, 2-methoxyethyl acetate, 2-ethoxyethyl ether, 2-(2-ethoxyethoxy)ethanol, 2-(2-butoxyethoxy)ethanol, 2-(2-ethoxyethoxy)ethyl acetate, 2-(2-butoxyethoxy)ethyl acetate, 2-phenoxyethanol, and diethylene glycol dimethyl ether. If necessary, solvents of two or more kinds can be mixed to obtain a mixture meeting the above-described requirements.

A dispersant of the colored resin composition is used to improve dispersivity of colorants in the resin. Ionic and anionic surfactants can be used as the dispersant. Specific examples thereof include sodium alkyl benzene sulfonates, polyfatty acid salts, fatty acid salt alkylphosphates, tetraalkyl ammonium salts, polyoxyethylene alkyl ether, and also organic pigment derivatives, and polyesters. Dispersants of different kinds may be used individually or dispersants of two or more kinds can be used as a mixture.

A well-known substrate material such as a glass substrate, a quartz substrate, and a plastic substrate can be used for the substrate 1. Among them, a glass substrate is preferred due to transparency, strength, heat resistance, and weather resistance thereof. A TFT substrate may be used when a color EL element is produced.

The banks 2 can be formed using a well-known method. Examples of suitable methods include a method by which a thin film of a metal or metal oxide is formed, e.g. by sputtering, on a substrate and then patterned, for example, by etching to form banks, a method by which a coloration agent such as a pigment or a dye is mixed with a photosensitive resin composition, the mixture is coated on a substrate to form a photosensitive resin composition layer, and banks are then formed by photolithography, and a method by which a black pigment and a thermosetting resin are dissolved in a solvent and banks are formed by a printing process. The banks 2 preferably have an ink repelling agent to prevent color mixing. Color mixing occurs when a color ink permeates to a color ink of the adjacent colored layer.

The central portion of the upper apex portion of the bank may be receded. With the receding central portion, even if ink is spattered for some reason on the bank when ink filling is performed by an ink jet method, the ink is accommodated in the recess of the central portion and, therefore, prevented from flowing out into the adjacent colored layer.

Examples of suitable ink-repelling agents include silicone-based and fluorine-containing material. Specific examples include silicone resins or silicone rubbers comprising a siloxane component and having an organic silicone or alkylfluoro group in a main or side chain, and also fluororesins such as vinylidene fluoride, vinyl fluoride, ethylene trifluoride, or copolymers thereof. Further, an ink repelling agent sometimes bleeds out during heating and adheres to the substrate, thereby causing discoloration during color ink filling. For preventing this, it is preferred that a fluorine-containing compound is used as the ink repelling agent. In order to prevent the ink repelling agent from bleeding out, it is preferred that an oligomer compound, rather than a low-molecular compound, be used.

The protective layer 4 is provided to improve smoothness and weather resistance of the colored filter surface. The protective layer 4 is formed by dissolving a compound having a carboxyl group and a compound having an epoxy group in a solvent, coating the resultant solution by an adequate coating method such as a spin coating method and a die coating method, and then crosslinking by heating. The compound having a carboxyl group may be a compound having a carboxyl group that can participate in crosslinking reaction with an epoxy group under heating. However, because carboxyl groups and epoxy groups are highly reactive, problems sometime arise in the manufacturing process. For this reason, it is preferred that a compound in which a carboxyl group is blocked by an alkyl vinyl ether be used as the compound having a carboxyl group. Specific examples of such compounds include monomers such as 1-isopropoxyethyl(meth) acrylate, 1-ethoxyethyl(meth)acrylate, 1-t-butoxyethyl (meth)acrylate, 1-(1-methylhexyl)ethyl(meth)acrylate, 1-(1, 1-dimethylpropoxy)ethyl(meth)acrylate, 1-isopropoxyethyl (meth)acrylamide, 1-ethoxyethyl(meth)acrylamide, 1-t-butoxyethyl(meth)acrylamide, 1-(1-methylhexyloxy)ethyl (meth)acrylamide, 1-(1,1-dimethylpropoxy)ethyl(meth) acrylamide, and 1,2,4-benzenetricarboxyclic acid-2,4-bis (propoxyethyl)-1-((meth)acryloxyethyl)ester or copolymers thereof. Examples of compounds having an epoxy group include a monomer such as glycidyl (meth)acrylate, glycidyl itaconate, glycidyl fumarate, and 3,4-epoxycyclohexyl (meth)acrylate or copolymers thereof. In particular, a protective layer that excels in transparency and weather resistance can be obtained by using an acrylic resin for the compound having an epoxy group.

In accordance with the present invention, it is possible to obtain a high-quality color filter in which colored layers have a flat shape, having an average thickness wherein the thickness at any specific point on any one of the colored layer may vary up to plus or minus 20% from the average, and in which no problems such as spread of color within colored layers are encountered. Furthermore, because the steps of drying and curing the colored resin compositions, which are separate steps in a conventional process, are performed as one step, the number of production steps and production cost can be reduced.

In addition, in order to form an organic electroluminescence element, as a colorant, an organic electroluminescence material should be used instead of the above-mentioned pigment.

Embodiments of the present invention, which is a color filter, will be described below in greater detail.

Embodiment 1

(Preparation of Banks)

A total of 10 parts by weight of a polyimide precursor (manufactured by Toray Industries, Inc.; Semicofine SP-510), 7.5 parts by weight of carbon black, 130 parts by weight of NMP, 5 parts by weight of a dispersant (a copper phthalocyanine derivative), 5 parts by weight of an initiator A, and 0.1 part by weight of an oligomer comprising a perfluoroalkyl group (manufactured by NEOS Co., Ltd.; FTX-720C) were dispersed for 3 h under cooling in a beads mill dispersing machine to prepare a bank composition. The bank composition was coated on an alkali-free glass substrate (manufactured by Corning Glass Co., Ltd.; Product No. 1737) to form a coating film with a thickness of about 2.0 μm using a spin coater. Pre-baking was then carried out for 20 min at 100° C., then post-baking was carried out for 60 min at 230° C. following the exposure and development step, and banks were formed. A contact angle measured at the upper apex portion of the banks with respect to a colored ink (surface tension 30 mN/m) was 30°, and the upper apex portion of the banks was confirmed to have ink repelling ability.

(Preparation of Color Inks)

[Preparation of Coloration Materials]

The following colorants were used for coloring the coloration material for use in the fabrication of a color filter. Pigments for red color: C. I. Pigment Red 254 (manufactured by Ciba Specialty Chemicals Co., Ltd.; Irgaphor Red B-CF) and C. I. Pigment Red 177 (manufactured by Ciba Specialty Chemicals Co., Ltd.; Cromaphtal Red A2B). Pigments for green color: C. I. Pigment Green 36 (manufactured by Toyo Ink Manufacturing Co., Ltd.; Lionol Green 6YK) and C. I. Pigment Yellow 150 (manufactured by Bayer Corp.; Fanchon Fast Yellow Y-5688). Pigments for blue color: C. I. Pigment Blue 15 (manufactured by Toyo Ink Manufacturing Co., Ltd.; Lionol Blue ES), C. I. Pigment Violet 23 (BASF Corp.; Paliogen Violet 5890). Red, green, and blue coloration materials were prepared using these pigments.

Further, a total of 20 parts of methacrylic acid, 10 parts of methyl methacrylate, 55 parts of butyl methacrylate, and 15 parts of hydroethyl methacrylate were dissolved in 300 g of butyl lactate, 0.75 part of azobisisobutylnitril was added under a nitrogen atmosphere, and a reaction was conducted for 5 h at 70° C. to produce an acryl copolymer resin. The acrylic copolymer resin thus obtained was diluted with diethylene glycol monomethyl ether to a resin concentration of 20% to obtain an acrylic varnish.

—Red Coloration Material

A mixture of the below-described composition was stirred and mixed uniformly and then dispersed for 5 h in a sand mill by using glass beads with a diameter of 1 mm. A red pigment dispersion was then produced by filtration with a 5 μm filter.

| Red pigment: C.I. Pigment Red 254 | 18 parts by weight |
| Red pigment: C.I. Pigment Red 177 | 2 parts by weight |
| Acrylic varnish (solids 20%) | 108 parts by weight |

Then, a mixture of the below-described composition was stirred and mixed uniformly, and a red coloration material was then obtained by filtration with a 5 μm filter.

| Above-described dispersion | 128 parts by weight |
| Diethylene glycol monomethyl ether | 50 parts by weight |
| Tetraethylene glycol dimethyl ether | 30 parts by weight |

—Green Coloration Material

A green coloration material was produced by the same method as the red coloration material so as to obtain the below-described composition.

| Green pigment: C.I. Pigment Green 36 | 16 parts by weight |
| Yellow pigment: C.I. Pigment Yellow 150 | 8 parts by weight |
| Acrylic varnish (solids 20%) | 102 parts by weight |
| Diethylene glycol monomethyl ether | 50 parts by weight |
| Tetraethylene glycol dimethyl ether | 30 parts by weight |

—Blue Coloration Material

A blue coloration material was produced by the same method as the red coloration material so as to obtain the below-described composition.

| Blue pigment: C.I. Pigment Blue 15 | 50 parts by weight |
| Violet pigment: C.I. Pigment Violet 23 | 2 parts by weight |
| Dispersant; Zeneca Co., Ltd.; Solsperse 20000 | 6 parts by weight |
| Acrylic varnish (solids 20%) | 200 parts by weight |
| Diethylene glycol monomethyl ether | 100 parts by weight |
| Tetraethylene glycol dimethyl ether | 60 parts by weight |

(Preparation of Protective Layer Coating Liquid)

A total of 5 parts by weight of 1-ethoxyethyl methacrylate monomer, 3 parts by weight of glydicyl methacrylate monomer, and 0.5 part by weight of an acidic catalyst were dissolved in a solvent.

(Preparation of Color Filter)

The color inks of R, G, B colors were used in openings of banks on the glass substrate, and patterns surrounded by banks of red (R), green (G), and blue (B) colors were filled employing an ink-jet printer having 108 pl, 150 dpi heads installed therein (manufactured by Seiko Instruments Inc.). Colored layers 3 were then formed by heating for 30 min at a hot plate at a temperature of 200° C. The cross-sectional profile in the colored layer thus formed was measured with a probe-type surface profile meter Dektak 3030. The results are shown in Table 1. The average film thickness within the colored layer obtained and the maximum/minimum film thickness within the colored layer are shown in Table 2. The protective layer coating liquid was then coated as an overlayer by a spin coating method to obtain a dry film thickness on the bank of 1 μm, and the coating was dried and thermally cured for 3 min at a hot plate at 90° C. and for 30 min in an oven at 230° C. to obtain a protective layer 4. The color filter thus obtained had an average film thickness of 1.1 μm, a maximum film thickness of 1.2 μm (109% of the average film thickness), a minimum film thickness (recess in the colored layer center) of 1.0 μm (91% of the average film thickness), had no mixed colors, excelled in flatness within the colored layer, and had a small concentration spread.

Embodiment 2

(Preparation of Banks)

Banks were prepared in the same manner as in Embodiment 1.

(Preparation of Color Inks)

Color inks were prepared in the same manner as in Embodiment 1, except that tetraethylene glycol dimethyl ether was replaced with dibutyl phthalate as a solvent contained in coloration materials of each color.

(Preparation of Protective Layer Coating Liquid)

A total of 5 parts by weight of 1-ethoxyethyl methacrylate monomer, 3 parts by weight of glydicyl methacrylate monomer, and 0.5 part by weight of an acidic catalyst were dissolved in a solvent.

(Preparation of Color Filter)

The color inks of R, G, B colors were used in openings of banks on the glass substrate, and patterns surrounded by banks of red (R), green (G), and blue (B) colors were filled employing an ink-jet printer having 108 pl, 150 dpi heads installed therein (manufactured by Seiko Instruments Inc.). Colored layers 3 were then formed by heating and thermally curing for 30 min at a hot plate at a temperature of 230° C. The cross-sectional profile in the colored layers thus formed was measured with a probe-type surface profile meter Dektak 3030. The results are shown in Table 1. The average film thickness within the colored layers obtained and the maximum/minimum film thickness within the colored layers are shown in Table 2. The protective layer coating liquid was then coated as an overlayer by a spin coating method to obtain a dry film thickness on the banks of 1 μm, and the coating was dried and thermally cured for 3 min at a hot plate at 90° C. and for 30 min in an oven at 230° C. to obtain a protective layer 4. The color filter thus obtained had an average film thickness of 1.1 μm, a maximum film thickness of 1.2 μm (109% of the average film thickness), a minimum film thickness (recess in the colored layer center) of 1.0 μm (91% of the average film thickness), had no mixed colors, excelled in flatness within the colored layers, and had a small concentration spread.

COMPARATIVE EXAMPLE 1

(Preparation of Banks)

Banks were prepared in the same manner as in Embodiment 1.

(Preparation of Color Inks)

Color inks were prepared in the same manner as in Embodiment 1, except that only diethylene glycol monomethyl ether was used as a solvent contained in coloration materials of each color.

(Preparation of Protective Layer Coating Liquid)

A total of 5 parts by weight of 1-ethoxyethyl methacrylate monomer, 3 parts by weight of glydicyl methacrylate monomer, and 0.5 part by weight of an acidic catalyst were dissolved in a solvent.

(Preparation of Color Filter)

The color inks of R, G, B colors were used in openings of banks on the glass substrate, and patterns surrounded by banks of red (R), green (G), and blue (B) colors were filled employing an ink-jet printer having 108 pl, 150 dpi heads installed therein (manufactured by Seiko Instruments Inc.). Colored layer 3 were then formed by heating and thermally curing for 30 min at a hot plate at a temperature of 230° C. The cross-sectional profile in the colored layers thus formed was measured with a probe-type surface profile meter Dektak 3030. The results are shown in Table 1. The average film thickness within the colored layers obtained and the maximum/minimum film thickness within the colored layers are shown in Table 2. The protective layer coating liquid was then coated as an overlayer by a spin coating method to obtain a dry film thickness on the banks of 1 μm, and the coating was dried for 30 min at a hot plate at 90° C. to obtain a protective layer 4. In the color filter thus obtained, an average film thickness was 1.1 μm, a maximum film thickness was 1.5 μm (136% of the average film thickness), a minimum film thickness was 0.7 μm (64% of the average film thickness), and a pattern could be formed that had no mixed colors, but flatness within the colored layer was degraded with respect to that of Embodiments 1, 2, and the display quality deteriorated due to color nonuniformity.

COMPARATIVE EXAMPLE 2

(Preparation of Banks)

Banks were prepared in the same manner as in Embodiment 1.

(Preparation of Color Inks)

Color inks were prepared in the same manner as in Embodiment 1.

(Preparation of Protective Layer Coating Liquid)

A total of 5 parts by weight of 1-ethoxyethyl methacrylate monomer, 3 parts by weight of glydicyl methacrylate monomer, and 0.5 part by weight of an acidic catalyst were dissolved in a solvent.

(Preparation of Color Filter)

The color inks of R, G, B colors were used in openings of banks on the glass substrate, and patterns surrounded by banks of red (R), green (G), and blue (B) colors were filled employing an ink-jet printer having 12 pl, 180 dpi heads installed therein (manufactured by Seiko Instruments Inc.). Colored layers 3 were then formed by drying for 3 min at 90° C. at a hot plate and then thermally curing for 30 min at 230° C. The cross-sectional profile in the colored layers thus formed was measured with a probe-type surface profile meter Dektak 3030. The results are shown in Table 1. The average film thickness within the colored layers obtained and the maximum/minimum film thickness within the colored layers are shown in Table 2. The protective layer coating liquid was then coated as an overlayer by a spin coating method to obtain a dry film thickness on the bank of 1 μm, and the coating was dried for 30 min at a hot plate at 90° C. to obtain a protective layer 4. In the color filter thus obtained, a pattern having no mixed colors was formed, but an average film thickness was 1.1 μm, a maximum film thickness was 1.4 μm (136% of the average film thickness), a minimum film thickness was 1.0 μm (91% of the average film thickness), flatness within the colored layer was degraded with respect to that of Embodiments 1, 2, and the display quality deteriorated due to color nonuniformity.

The table showing the cross-sectional shape of the colored layer produced in the embodiments of the invention and comparative examples, and the table showing the average film thickness of the colored layers and maximum/minimum film thickness within the colored layers produced according to the invention are presented below.

The average film thickness of the colored layers does not change although the protective layer is provided. When the protective layer is provided, the film thickness can be analyzed from the microphotograph of the cross section.

TABLE 1

Cross-sectional profiles within colored layers in embodiments and comparative examples.

Example 1

Example 2

Comparative Example 1

Comparative Example 2

TABLE 2

Uniformity within colored layers (average film thickness and maximum/minimum film thickness variation)

| Example | Average film thickness | Maximum film thickness (% of average film thickness) | Minimum film thickness (% of average film thickness) |
| --- | --- | --- | --- |
| Embodiment 1 | 1.1 μm | 1.2 μm (109) | 1.0 μm (91) |
| Embodiment 2 | 1.1 μm | 1.2 μm (109) | 1.0 μm (91) |
| Comparative Example 1 | 1.1 μm | 1.5 μm (136) | 0.7 μm (64) |
| Comparative Example 2 | 1.1 μm | 1.4 μm (127) | 1.0 μm (91) |

(This application is incorporated by reference which is Japanese application number 2005-062033, which is filed on Mar. 7, 2005.)

What is claimed is:

1. A color filter having a color pattern formed therein, comprising:
   a substrate;
   banks on said substrate; and
   a colored layer, provided and patterned between said banks by an ink-jet printer, having an average thickness wherein a thickness at any specific point on the colored layer may vary up to plus or minus 20% from the average,
   said banks having or containing an ink-repelling agent and/or an upper apex portion of said banks having ink repelling ability,
   said colored layer having both an end portion and a center portion,
   said center portion of said colored layer having in part a receded portion,
   a thickness of said colored layer at said receded portion in said center portion being smaller than a thickness of said colored layer at a portion which is in said center portion and which surrounds said receded portion, and
   a thickness of said colored layer at said receded portion in said center portion being larger than a thickness of said colored layer at a portion which is in said end portion and at which said colored layer is not formed on said banks.

2. The color filter having a color pattern formed therein according to claim 1, wherein
   the thickness at any specific point on the colored layer does not vary neither beyond plus 10% nor minus 10% from the average.

3. The color filter having a color pattern formed therein according to claim 1, wherein
   there are a plurality of said colored layers, and the adjacent colored layers have the same average thickness.

4. The color filter having a color pattern formed therein according to claim 1, wherein there are a plurality of colored layers,
   said colored layers include a red colored layer, a green colored layer, and a blue colored layer, and each colored layer has an average thickness wherein the thickness at any specific point on any one of the colored layer may vary up to plus or minus 20% from the average of that particular colored layer.

5. The color filter having a color pattern formed therein according to claim 1, wherein
   said ink-repelling agent is silicone resin or silicone rubber, comprising a siloxane component and having an organic silicone or alkylfluoro group in a main or side chain.

6. The color filter having a color pattern formed therein according to claim 1, wherein
said ink-repelling agent includes an oligomer compound.

7. The color filter having a color pattern formed therein according to claim 1, wherein
said ink-repelling agent is fluororesins comprising vinylidene fluoride, vinyl fluoride, ethylene trifluoride, or copolymers thereof.

8. The color filter having a color pattern formed therein according to claim 1, wherein
the upper apex portion of said banks recedes at the central portion.

9. The color filter having a color pattern formed therein according to claim 1, wherein
a protective layer is provided on said banks and said colored layer.

10. The color filter having a color pattern formed therein according to claim 1, wherein
a protective layer is provided on said bank and said colored layer; and
the protected layer is formed from an acrylic resin having an epoxy group.

* * * * *